(12) United States Patent
    Kobayashi (10) Patent No.: US 11,276,186 B2
(45) Date of Patent: Mar. 15, 2022

(54) IMAGE PROCESSING APPARATUS, IMAGE CAPTURING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Masayuki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 369 days.

(21) Appl. No.: 16/440,089

(22) Filed: Jun. 13, 2019

(65) Prior Publication Data

US 2019/0385316 A1    Dec. 19, 2019

(30) Foreign Application Priority Data

Jun. 14, 2018    (JP) .............................. JP2018-113845

(51) Int. Cl.
    *G06K 9/00*    (2006.01)
    *G06T 7/254*    (2017.01)
    *G06K 9/62*    (2022.01)

(52) U.S. Cl.
    CPC ............ *G06T 7/254* (2017.01); *G06K 9/6215* (2013.01); *G06T 2207/10016* (2013.01)

(58) Field of Classification Search
    CPC ........... G06T 7/20; G06T 7/194; G06T 7/254; G06T 2207/10016; G06K 9/6215
    See application file for complete search history.

(56) References Cited

U.S. PATENT DOCUMENTS

| 5,706,367 | A | * | 1/1998 | Kondo | ..................... H04N 7/54 |
| | | | | | 382/236 |
| 5,748,775 | A | * | 5/1998 | Tsuchikawa | ........ G06K 9/00369 |
| | | | | | 375/E7.083 |
| 2010/0027842 | A1 | * | 2/2010 | Guo | ......................... G06T 7/136 |
| | | | | | 382/103 |
| 2010/0208998 | A1 | * | 8/2010 | Van Droogenbroeck | .................... |
| | | | | | G06T 7/215 |
| | | | | | 382/195 |
| 2011/0150282 | A1 | * | 6/2011 | Gupta | ................ G06K 9/00771 |
| | | | | | 382/103 |
| 2012/0114173 | A1 | * | 5/2012 | Ikenoue | .................. G06T 7/194 |
| | | | | | 382/103 |
| 2015/0003675 | A1 | * | 1/2015 | Nakagami | ............... G06T 7/254 |
| | | | | | 382/103 |
| 2017/0186179 | A1 | * | 6/2017 | Miyano | ............ G08B 13/19604 |

FOREIGN PATENT DOCUMENTS

| JP | 4811653 B | | 11/2011 | |
| JP | 2013257785 A | * | 12/2013 | ............... G06T 7/20 |
| JP | 2013257785 A | | 12/2013 | |

* cited by examiner

*Primary Examiner* — Avinash Yentrapati (74) *Attorney, Agent, or Firm* — Carter, DeLuca & Farrell LLP (57) ABSTRACT

A captured image is registered, as a background image, from among captured images sequentially inputted. In a case where it is determined that a moving object is included in a first background image registered at a first timing, the registered first background image is replaced with a second background image registered at a second timing prior to the first timing.

9 Claims, 6 Drawing Sheets

TIME

| TIME (UPDATE TIME) | BACKGROUND DATA | NUMBER OF REMOVAL DETECTIONS |
|---|---|---|
| 10:57:00 | IMAGE | 0 |
| 10:58:00 | IMAGE | 1 |
| 10:59:00 | IMAGE | 0 |
| ⋮ | ⋮ | ⋮ |

IMAGE PROCESSING APPARATUS, IMAGE CAPTURING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique of detecting an object within an image.

Description of the Related Art

Figure 1:
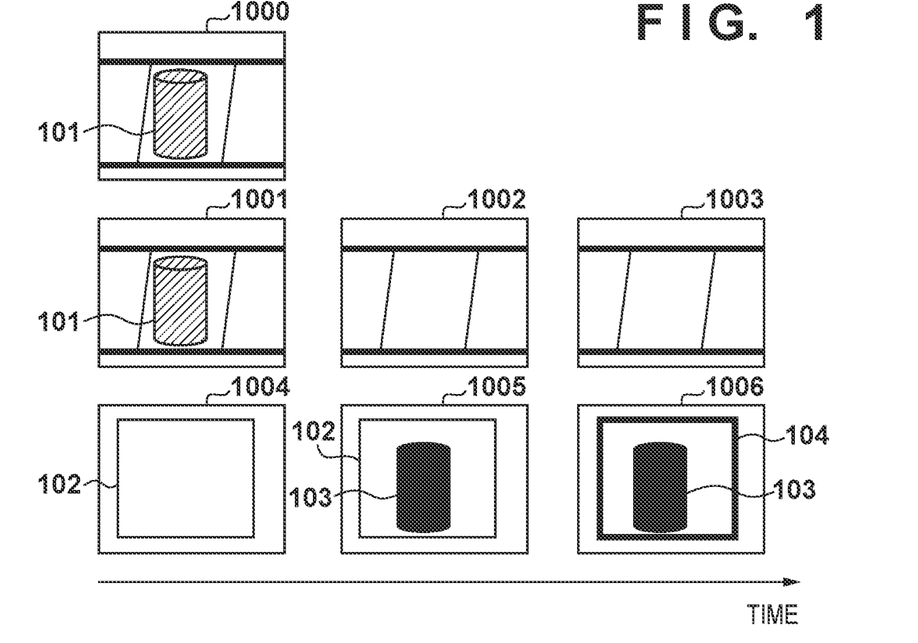
FIG. 1 is a view which illustrates an example of removal detection processing using a background difference method.

Conventionally, for a detection of the removal of a specific object in which image processing is used, a background difference method, in which a comparison between a captured image and a background image that is obtained in advance is performed and a region not existing in the background image that is obtained in advance is extracted, is often used. FIG. 1 illustrates an example of removal detection processing in which the background difference method is used. Reference numeral 1000 is a background image including an object 101, and reference numerals 1001 to 1003 are captured images captured in this order. Reference numeral 1004 indicates a difference between the background image 1000 and the captured image 1001, reference numeral 1005 indicates a difference between the background image 1000 and the captured image 1002, and reference numeral 1006 indicates a difference between the background image 1000 and the captured image 1003.

Since the object 101 is removed at a timing between the captured image 1001 and the captured image 1002, the object 101, which appears in the captured image 1001, does not appear in the captured images 1002 and 1003 as illustrated in FIG. 1. For this reason, in the differences 1005 and 1006, a background difference 103 exists within a removal detection region 102 which was set in advance. An alert 104 (display of the frame surrounding the background difference 103) occurs when it is determined that the removal occurred in a case where the size of the background difference 103 is a stipulated size or more and the difference was present in the captured image for a fixed time or more.

In order to guarantee the accuracy of the removal detection, it is necessary to extract an accurate background difference, and to do so it is necessary to always set an appropriate background image. Although it is necessary to update the background image whenever a change in environment such as an illumination condition occurs in order to set an appropriate background image, there is a possibility that a background image that includes a moving object will be set when the background image is updated.

Figure 2:
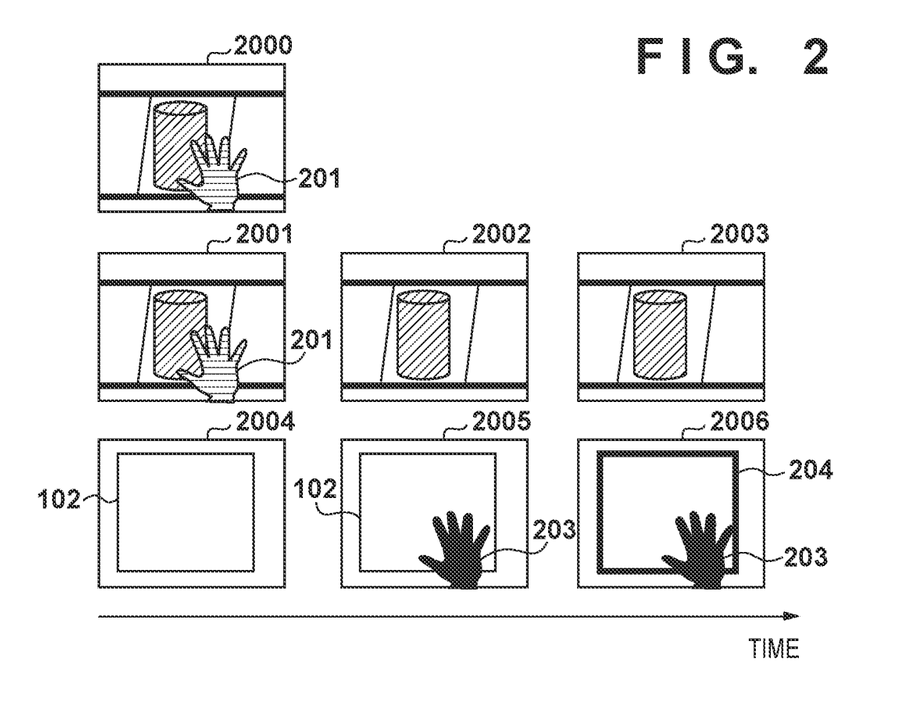
FIG. 2 is a view which illustrates an example of removal detection processing in the case of setting a background image including a moving object.

FIG. 2 illustrates an example of removal detection processing in a case where a background image including a moving object is set. Reference numeral 2000 is a background image that includes a hand 201 which is a moving object. Reference numerals 2001 to 2003 are captured images which are captured in that order. Reference numeral 2004 indicates a difference between the background image 2000 and the captured image 2001, reference numeral 2005 indicates a difference between the background image 2000 and the captured image 2002, and reference numeral 2006 indicates a difference between the background image 2000 and the captured image 2003.

The hand 201 which is captured in the captured image 2001 does not appear in the captured images 2002 and 2003. Here, the background difference 203 occurs within the removal detection region 102 in the differences 2005 and 2006. By this, there is a possibility that an alert 204 (display of the frame surrounding the background difference 203) will occur when it is determined that the removal occurred.

A method in which, in order to resolve such a problem, the updating of the background image by an updating means is interrupted when a human body which is not appropriate as a background is detected, and the processing is resumed when the human body is no longer detected is disclosed in Japanese Patent No. 4811653. Additionally, a method in which a frame for which a difference does not exist is extracted by difference-between-frames processing and updating of the background image is performed by using such a frame is disclosed in Japanese Patent Laid-Open No. 2013-257785.

However, in the conventional technique disclosed in the above-described Japanese Patent No. 4811653, it is necessary to determine the moving object as a human body and application is thought to be difficult in cases of quick changes and where an angle of view is limited. Also, in the conventional technique disclosed in Japanese Patent Laid-Open No. 2013-257785, it is necessary to also calculate a difference between frames in addition to the background difference, and the computation load becomes large.

SUMMARY OF THE INVENTION

In the present invention, a technique for registering a background image appropriate for removal detection is provided.

According to the first aspect of the present invention, there is provided an image processing apparatus comprising: a registration unit configured to register, as a background image, a captured image from among captured images sequentially inputted; a determination unit configured to determine whether or not a moving object is included in a first background image that the registration unit registered at a first timing; and a replacing unit configured to, in a case where the determination unit determines that a moving object is included in the first background image, replace the first background image that the registration unit registered with a second background image registered at a second timing prior to the first timing.

According to the second aspect of the present invention, there is provided an image capturing apparatus, comprising: an image capturing unit configured to obtain a captured image, and an image processing apparatus, comprising: a registration unit configured to register, as a background image, a captured image from among captured images sequentially inputted; a determination unit configured to determine whether or not a moving object is included in a first background image that the registration unit registered at a first timing; and a replacing unit configured to, in a case where the determination unit determines that a moving object is included in the first background image, replace the first background image that the registration unit registered with a second background image registered at a second timing prior to the first timing.

According to the third aspect of the present invention, there is provided an image processing method that an image processing apparatus performs, the method comprising: registering, as a background image, a captured image from among captured images sequentially inputted; determining whether or not a moving object is included in a first background image registered at a first timing; and in a case where it is determined that a moving object is included in the first background image, replacing the first background image with a second background image registered at a second timing prior to the first timing.

According to the fourth aspect of the present invention, there is provided a non-transitory computer-readable storage medium storing a computer program for causing a computer to function as: a registration unit configured to register, as a background image, a captured image from among captured images sequentially inputted; a determination unit configured to determine whether or not a moving object is included in a first background image that the registration unit registered at a first timing; and a replacing unit configured to, in a case where the determination unit determines that a moving object is included in the first background image, replace the first background image that the registration unit registered with a second background image registered at a second timing prior to the first timing.

Further features of the present invention will become apparent from the following description of exemplary embodiments (with reference to the attached drawings).

DESCRIPTION OF THE EMBODIMENTS

Below, explanation will be given for embodiments of the present invention with reference to the accompanying drawings. Note that the embodiments described below are examples in which the present invention is specifically embodied, and are specific embodiments of the configuration described in the scope of the claims.

First Embodiment

Figure 3:
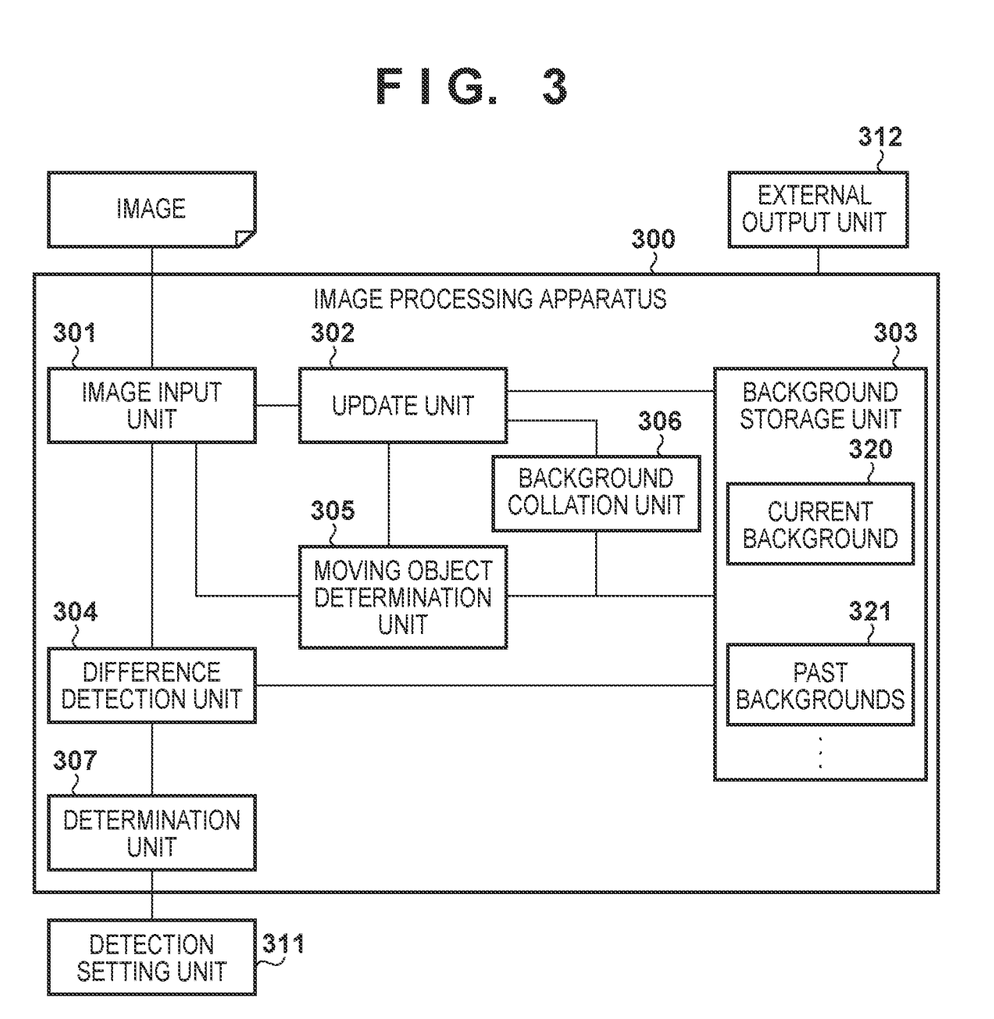
FIG. 3 is a block diagram which illustrates an example of a functional arrangement of an image processing apparatus.

Firstly, description is given regarding a functional configuration example of an image processing apparatus according to the present embodiment by using the block diagram of FIG. 3. Note that in FIG. 3, although an image processing apparatus 300, a detection setting unit 311, and an external output unit 312 are shown separately, two or more of these may be integrated.

Figure 9:
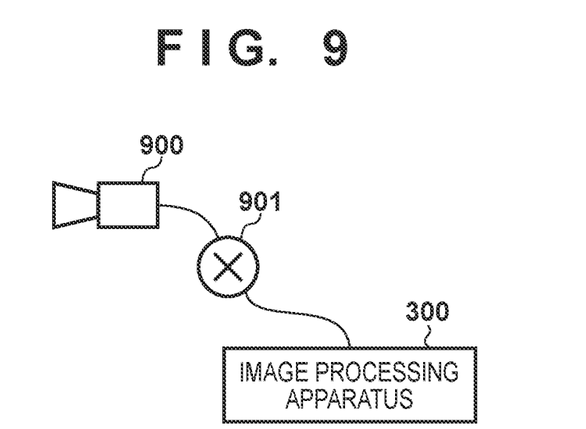
FIG. 9 is a view which illustrates an example of a configuration of a system.

An image input unit 301 obtains captured images inputted in sequence into the image processing apparatus 300. The supply source of the captured images is not limited to a specific supply source. For example, configuration may also be taken such that the image input unit 301 obtains a captured image for each frame outputted from an image capturing apparatus. For example, as illustrated in FIG. 9, a system having the image processing apparatus 300 and an image capturing apparatus 900 which captures images of a plurality of frames is constructed. At that time, configuration may also be taken such that the image processing apparatus 300 (image input unit 301) obtains a captured image for each frame that is transmitted via a network 901 from the image capturing apparatus 900. In addition, configuration may also be taken such that the image input unit 301 obtains a captured image for each frame from an apparatus on which a video is recorded (a server apparatus, for example). Also, configuration may also be taken such that the image input unit 301 obtains a captured image from each frame stored in a memory (not shown) within the image processing apparatus 300. Additionally, the captured images are not limited to being an image of a respective frame configuring a video and may each be a plurality of still images obtained by capturing a plurality of times.

An update unit 302, in a background storage unit 303, registers, as a background image, a captured image every number of frames from among the captured images that the image input unit 301 obtained. For example, configuration may also be taken such that the update unit 302, in the background storage unit 303, registers, as the background image, a captured image every N frames (N being an integer greater than or equal to 2) from among the captured images that the image input unit 301 obtained in sequence. Also, configuration may also be taken such that the update unit 302 samples, every predetermined amount of time, captured images that the image input unit 301 obtained in sequence and registers the sampled captured images to the background storage unit 303 as the background image. Also, configuration may also be taken such that the update unit 302 irregularly (when there is a change in environment, for example) samples captured images that the image input unit 301 in sequence obtains and registers the irregularly sampled captured images to the background storage unit 303 as the background image. A change in environment is a change in ambient luminance of the image processing apparatus 300, for example. A current background 320 which is a recently registered background image (a first background image registered at a first timing) and past backgrounds 321 which is a plurality of background images (a second background image registered at a second timing prior to the first timing) registered before the current background 320 are stored in the background storage unit 303.

A difference detection unit 304 generates a difference between the captured images that the image input unit 301 obtained and the current background 320 registered to the background storage unit 303. In a case where the captured image is registered as the current background 320 in the background storage unit 303, a moving object determination unit 305 determines whether or not a moving object is included in the current background 320.

A background collation unit 306 generates a difference between a captured image that the image input unit 301 obtained and one or more second background images from among a plurality of second background images included in the past backgrounds 321 registered in the background storage unit 303.

A determination unit 307, based on a difference that the difference detection unit 304 generated, determines whether or not there was a removal of an object by determining the existence or absence of an object in "a removal detection region set by the detection setting unit 311" within the captured image that the image input unit 301 obtained.

The detection setting unit 311 performs a setting of parameters in accordance with the removal detection. In the parameters, information for defining a removal detection region within an image (such as coordinates of the four corners of the removal detection region), a time that should be reached in order to determine that there was removal, "a ratio at which an object occupies the removal detection region" that should be met in order to determine that there was removal, and the like are included. Note, the removal detection region may be the entire region of the image rather than being limited to a partial region of the image.

The external output unit 312 outputs various processing results (results of processing by the difference detection unit 304 or the determination unit 307, for example) for the image processing apparatus 300. The output destination of the results of processing by the external output unit 312 is not limited to a specific output destination. For example, the external output unit 312 may output the processing results to an external apparatus via a wireless and/or wired network, may output the processing results to a display apparatus as images or characters, and may output an audio signal representing the processing results to a speaker. Also, the external output unit 312 may output the processing results as are or may process and output the processing results.

Figure 5:
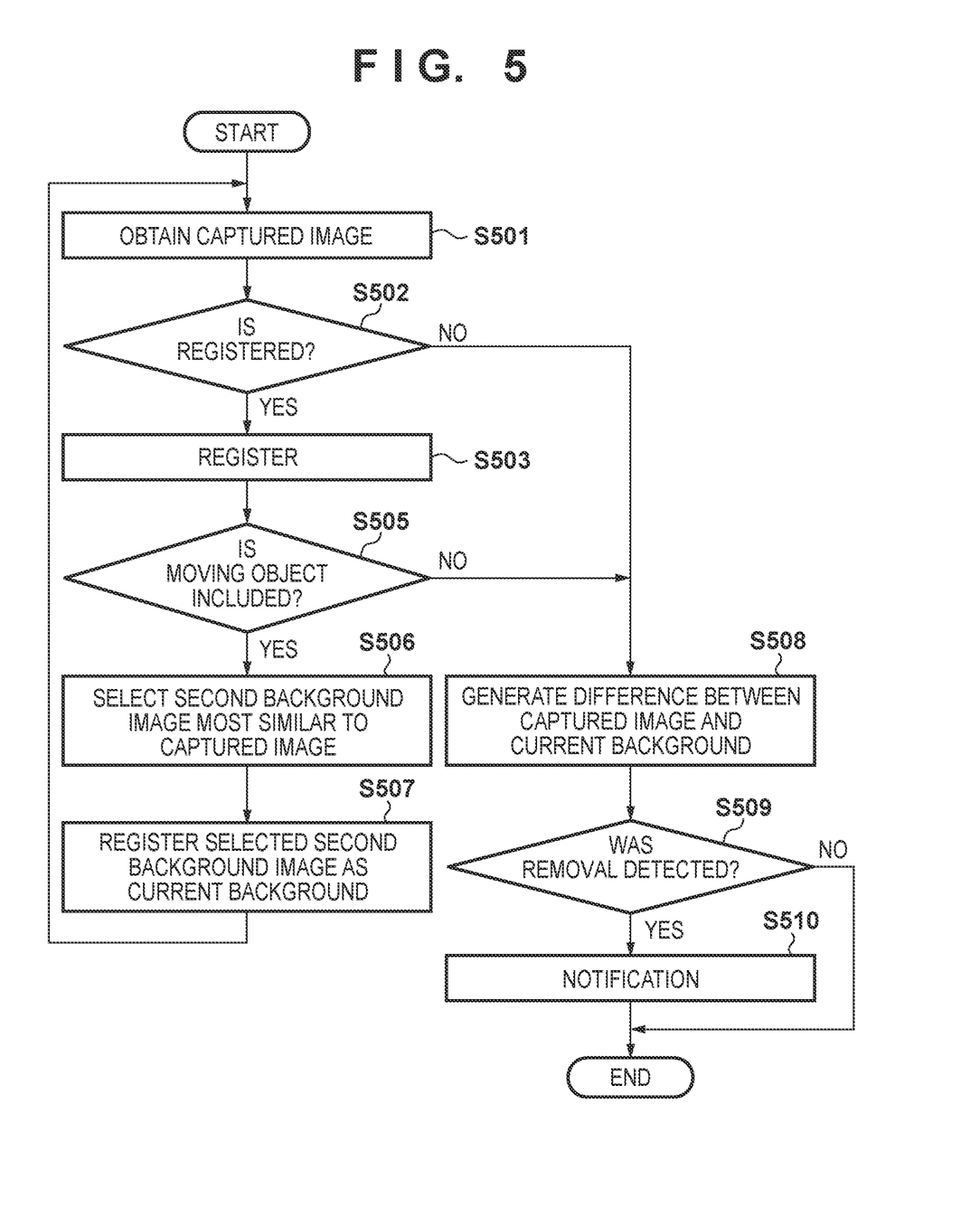
FIG. 5 is a flowchart describing an operation in an image processing apparatus 300.

Next, description in accordance with the flowchart of FIG. 5 is given regarding an operation of the image processing apparatus 300. Note, the processing according to the flowchart of FIG. 5 is processing that the image processing apparatus 300 performs in a case where a captured image of one frame is inputted to the image processing apparatus 300. Here, the image processing apparatus 300 performs processing according to the flowchart of FIG. 5 on the captured image of each frame inputted to the image processing apparatus 300.

In step S501, the image input unit 301 obtains a captured image inputted into the image processing apparatus 300. At that time, the external output unit 312 externally outputs the captured image obtained in step S501.

In step S502, the update unit 302 determines whether or not the captured image obtained in step S501 is to be registered to the background storage unit 303 as a background image. For example, in a case where the captured image of every Nth frame is registered as the background image, the update unit 302 determines that the captured image obtained in step S501 is to be registered if the captured image is a captured image of the Nth frame from the previously registered captured image. Meanwhile, the update unit 302 determines that the captured image obtained in step S501 is not to be registered if the captured image is not the captured image of the Nth frame from the previously registered captured image. In this way, the determination processing in step S502 is not limited to a specific determination process if the update unit 302 registers the captured image of every number of frames to the background storage unit 303 as the background image.

In a case where it is determined that the captured image obtained in step S501 is to be registered to the background storage unit 303 as the background image, the processing advances to step S503. Meanwhile, in a case where it is determined that the captured image obtained in step S501 is not to be registered to the background storage unit 303 as the background image, the processing advances to step S508. In step S503, the update unit 302 registers the captured image obtained in step S501 to the background storage unit 303 as the current background 320.

The moving object determination unit 305 determines whether or not a moving object is included in the current background 320 in step S505. There are various methods for determining whether or not a moving object is included in the current background 320, and limitation is not made to a specific method. Hereinafter, one example of a method of determination is described.

Whenever a captured image is inputted, the background collation unit 306 generates a difference between the captured image and the past backgrounds 321 registered to the background storage unit 303. For example, the background collation unit 306 generates difference images for the difference between the captured image and one or more second background images registered to the background storage unit 303. The method of generating a difference image for the difference between two images is not limited to a specific generation method. For example, the generation method may be a method in which a difference value (absolute value) between a pixel value of a pixel at a pixel position (x, y) within one image and a pixel value of a pixel at a pixel position (x, y) within another image is made to be the pixel value of a pixel at a pixel position (x, y) within the difference image.

Also, the moving object determination unit 305 checks a change of the size (a number of pixels that configure a background difference, for example) of an image region (the background difference) configured by pixels whose pixel value is greater than a predetermined value in the difference image. Also, the moving object determination unit 305 determines that a moving object is included in the current background 320 if the size of the background difference is less than a defined size. Note, the method for "determining whether or not a moving object is included in the current background 320" based on the size of the background difference is not limited to the above-described method. Also, the method for "determining whether or not a moving object is included in the current background 320" based on a difference image for a difference between a captured image and a second background image is not limited to the above-described method. Note, configuration may also be taken such that the external output unit 312 outputs the background difference.

Also, in a case where it is determined that a moving object is included in the current background 320, processing advances to step S506. Meanwhile, in a case where it is determined that a moving object is not included in the current background 320 (in a case where a condition for determining that a moving object is included in the current background 320 is not satisfied, for example), the processing advances to step S508.

In step S506, the update unit 302, from among the second background images registered to the background storage unit 303, selects, as a selected second background image, a second background image that is most similar to a captured image that the image input unit 301 obtained from the time of the determination of step S505 (at the time of the determination or immediately after, for example).

For example, for each second background image registered to the background storage unit 303, the update unit 302 calculates a similarity to the captured image. There are various methods for calculating the similarity between two images and limitation is not made to a specific method. For example, a similarity may be set to be higher the smaller that an SSD (Sum of Squared Difference) between the two images is, and the similarity may be set to be lower the larger the SSD between the two images is. Also, the update unit 302 selects, as the selected second background image, a second background image that is from among the respective second background images registered in the background storage unit 303 and whose similarity to the captured image is highest.

Then, in step S507, the update unit 302 registers the selected second background image as the current background 320 to the background storage unit 303 by updating (replacing) the background image registered as the current background 320 with the selected second background image that was selected in step S506.

In step S508, the difference detection unit 304 generates a difference between the captured image that the image input unit 301 obtained and the current background 320. For example, it generates a difference image for the difference between the captured image that the image input unit 301 obtained and the current background 320 as a difference by the above-described difference image generation method.

In step S509, the determination unit 307 determines whether or not there was a removal of an object by determining the existence or absence of an object in the removal detection region within the captured image based on the difference image generated in step S508. For example, the determination unit 307 determines that an object exists within the captured image in a case where an image region (having a size greater than or equal to a predetermined size) configured by pixels having a pixel value greater than or equal to a predetermined value within the removal detection region in the difference image is detected. Meanwhile, the determination unit 307 determines that an object does not exist within the captured image in a case where an image region (having a size greater than or equal to a predetermined size) configured by pixels having a pixel value greater than or equal to a predetermined value within the removal detection region in the difference image is detected. Then, the determination unit 307 determines that a removal occurred in a case (removal condition) where it is determined that an object exists in the captured image of the Pth frame and where it is determined that an object does not exist in a captured image of each frame from the (P+1)th frame to the Qth (Q>P+1) frame. Q is a parameter that the detection setting unit 311 sets as the above-described "time". Meanwhile, the determination unit 307 determines that a removal did not occur in a case where the removal condition has not been satisfied.

In a case where the determination unit 307 determines that removal occurred, the processing advances to step S510, and in a case where it determines that removal did not occur, this time's processing according to the flowchart of FIG. 5 ends.

Note, the condition for advancing to step S510 is not limited to the above-described condition, and the processing may advance to step S510 in a case where a condition that a parameter set by the detection setting unit 311 defines is satisfied.

In step S510, the external output unit 312 notifies that there was a removal. There are various methods for notifying that there was removal, and limitation is not made to a specific method. For example, configuration may also be taken such that the external output unit 312, in a case where a captured image that the image input unit 301 obtained is displayed on the display apparatus, displays a removal detection region frame in the captured image with a display appearance that is different from the display appearance in a case where there was no removal. For example, the color or thickness of the frame may change compared to a case where there was no removal and the frame may be caused to flash when it is displayed. Also, text or icons indicating that there was a removal may be displayed, and a sound indicating that there was a removal may be output via a speaker.

Also, configuration may also be taken such that the external output unit 312 externally transmits a message such as an email indicating that there was a removal.

Figure 4:
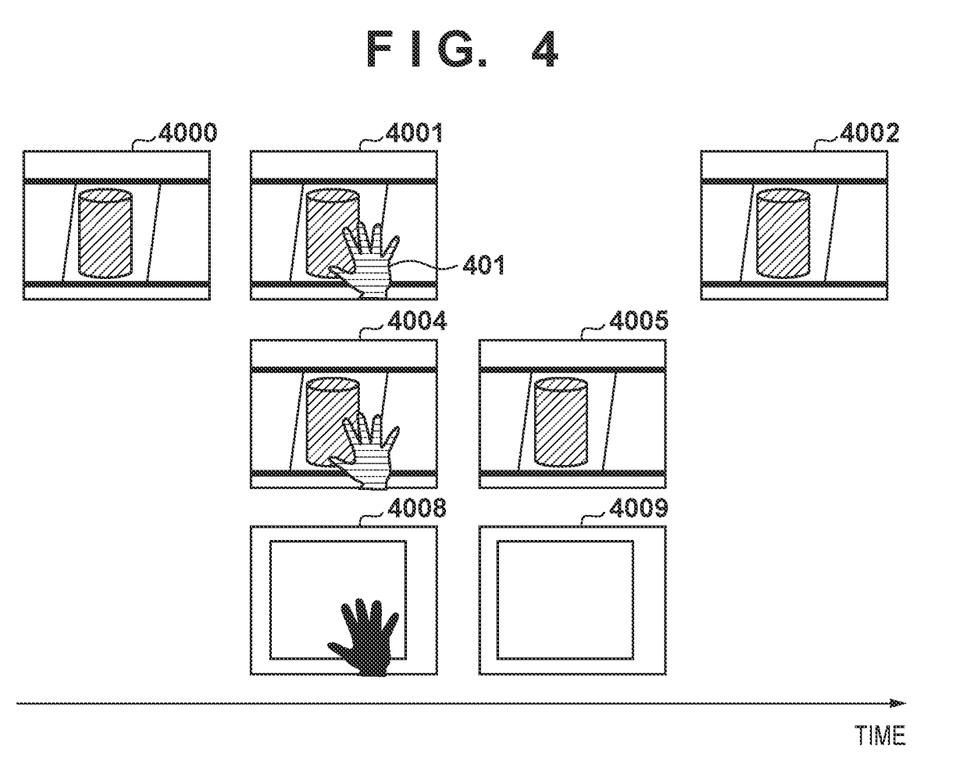
FIG. 4 is a view which illustrates an example of updating a background image.

Description is given using FIG. 4 regarding an example of updating a background image. The current background 320 is updated from a background image 4000 to a background image 4001 including a hand 401 as a moving object. At that time, although the hand 401, as a moving object, is included in a difference 4008 between a captured image 4004 inputted after this update and the background image 4000, the hand 401, as a moving object, is not included in a difference 4009 between a captured image 4005 inputted thereafter and the background image 4000. In such a case, the background image 4001 registered as the current background 320 is replaced with the second background image 4002 most similar to the captured image 4005.

In this way, by virtue of the present embodiment, even if a background image that includes a moving object ends up being registered as a background image to be used to perform removal detection, it is possible to return the background image to an appropriate background image, and it is possible to thereafter perform the removal detection without an accuracy reduction.

Second Embodiment

In each of the following embodiments including the present embodiment, description is given regarding differences from the first embodiment, and the configuration is similar to the first embodiment unless specifically touched upon. In the first embodiment, although when updating the background image, the background image prior to the update is always registered as a second background image, the method of holding the second background images may be switched depending on the background image update frequency. For example, in a case where the update frequency of the background image is high, the amount of data that accumulates will become large when all background images are accumulated as second background images. For this reason, a method in which, in a case where an update frequency of background image is higher than a predetermined frequency, only the most recent second background image or a predetermined number of second background images tracing back into the past from the most recent second background image continue to be held as the past backgrounds 321 may be used. Such control is performed by the update unit 302, for example. Also, the number of second background images to be held may be set by a user in accordance with the situation in which the invention is applied.

Third Embodiment

In the first embodiment, the update unit 302 selects, as the selected second background image, a second background image that is from among the respective second background images registered in the background storage unit 303 and whose similarity to the captured image is highest. As an example, the update unit 302 selects, as the selected second background image, a second background image that is from among the respective second background images registered in the background storage unit 303 and whose similarity to the captured image is highest. However, the captured image may be selected as the selected second background image in a case where the similarity between the captured image and each second background image does not exceed any predetermined value. Also, the predetermined value may be appropriately determined by the user in accordance with the use case.

Fourth Embodiment

Figure 7:
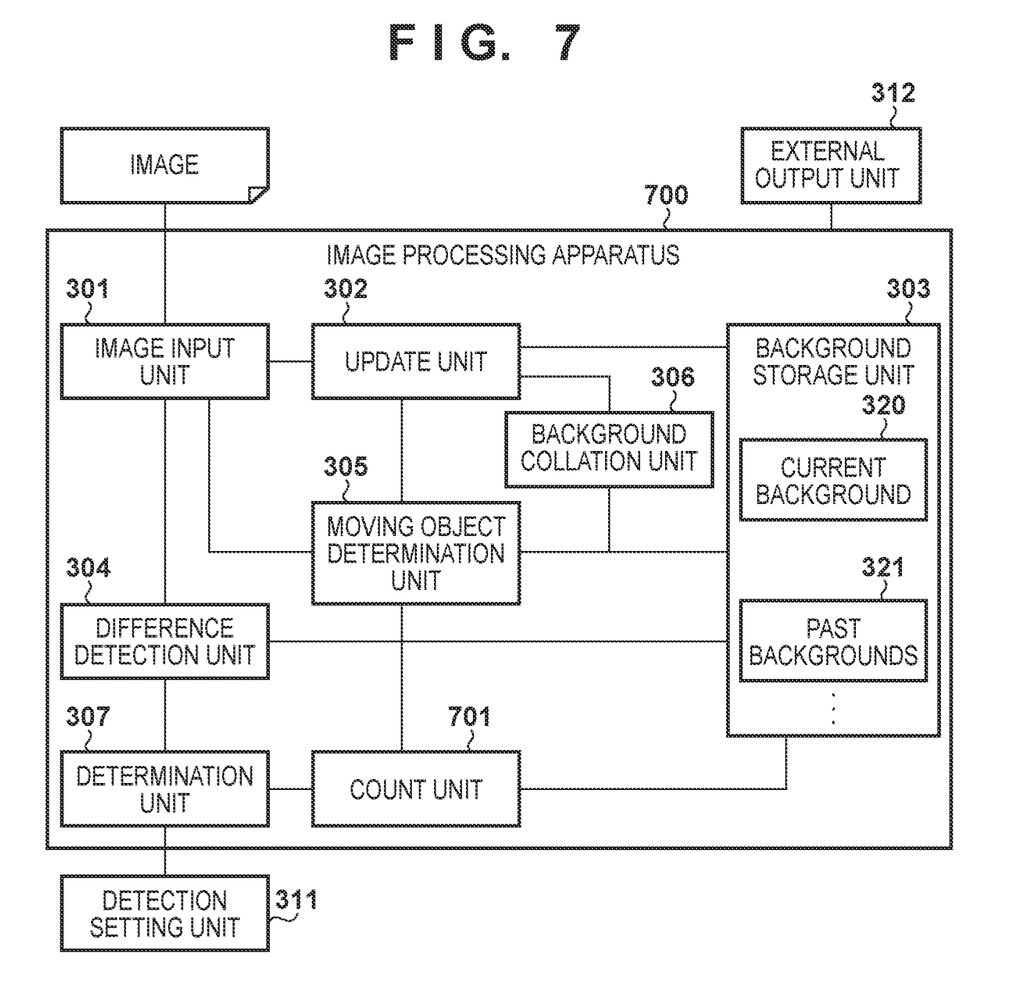
FIG. 7 is a block diagram which illustrates an example of a functional arrangement of the image processing apparatus.

In a case of monitoring of a store shelf and the like by using the removal detection, it is possible to know a number of products removed from the place by counting the number of removals detected. Description is given using the block diagram of FIG. 7 regarding an example of a functional configuration of an image processing apparatus that counts the number of such removal detections. In FIG. 7, the same reference numerals are given to functional units that are similar to functional units shown in FIG. 3, and the description concerning these functional units is omitted. Note that in FIG. 7, although an image processing apparatus 700, the detection setting unit 311, and the external output unit 312 are shown separately, two or more of these may be integrated.

The image processing apparatus 700 is the image processing apparatus 300 of FIG. 3 with a count unit 701 added thereto. In a case where the determination unit 307 determines that "a removal occurred", the count unit 701 sets a count for the background images registered as the current background 320 to "1" at that point in time. The initial value of the count is "0". Meanwhile, in a case where it is determined that a moving object is not included in the current background 320, the count unit 701 sets the count for the background images registered as the current background 320 to "0".

Figure 6:
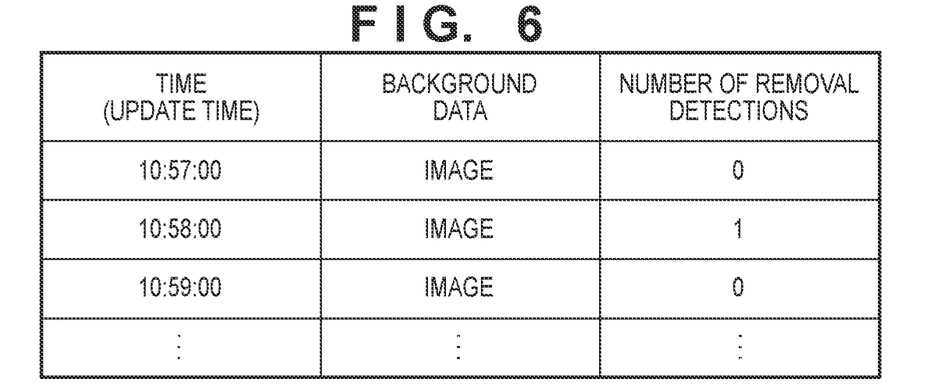
FIG. 6 is a view which illustrates an example of a configuration of table information.

An example of a configuration of table information that the count unit 701 manages in the background storage unit 303 is illustrated in FIG. 6. "Time (update time)" denotes a time when the current background 320 was registered, "background data" denotes an image file name of the current background 320, and "number of removal detections" denotes a count value. Also, the external output unit 312 notifies the user of the total number of removal detections respectively registered to the table information of FIG. 6 as the total number of removals. The notification method, similarly to in the first embodiment, is not limited to a specific notification method, and may display a total number of removals as an image or text to the display apparatus, may notify of the total number of removals through speakers as audio, and may notify of the total number of removals with a message. Note, in the present embodiment, registration processing (update processing of the current background 320) of the background image is performed when a removal is detected.

Fifth Embodiment

Although all functional units illustrated in FIGS. 3 and 7 may be implemented by hardware, some may be implemented by software (computer program). In the case of the latter, a computer apparatus which can execute this software can be applied to the above-described image processing apparatuses 300 and 700. Description is given using the block diagram of FIG. 8 regarding an example of a hardware configuration of a computer apparatus that can be applied to the image processing apparatuses 300 and 700.

Figure 8:
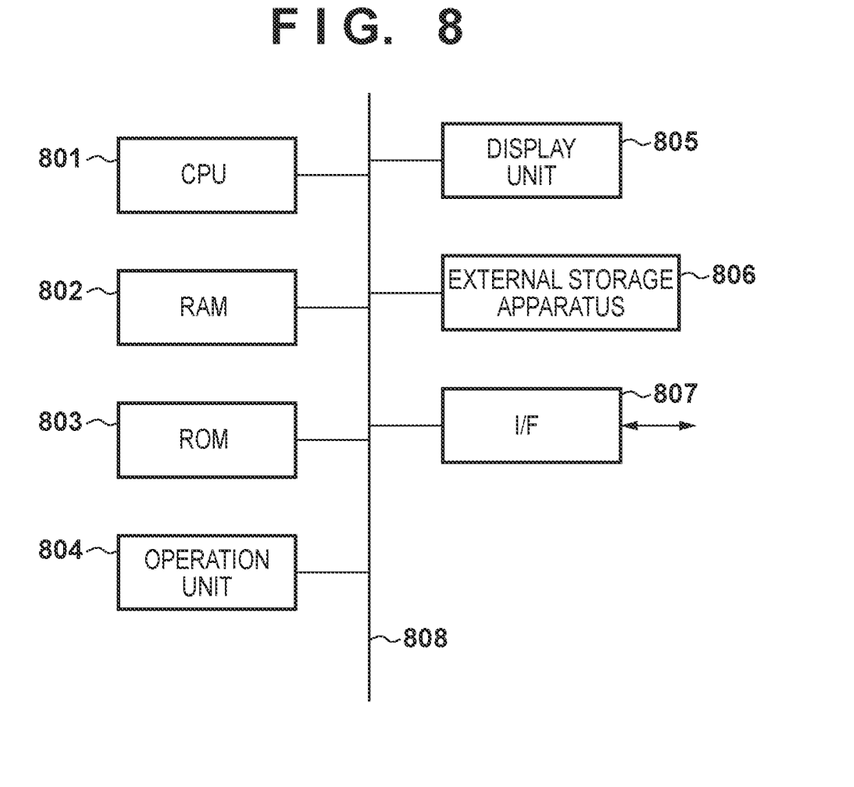
FIG. 8 is a block diagram which illustrates an example of a hardware configuration of a computer apparatus.

A CPU 801 executes various processing by using data and a computer program stored in a RAM 802 or a ROM 803. By this, the CPU 801 performs operational control of the entire computer apparatus and executes or controls each process described above as something performed by the image processing apparatuses 300 and 700.

The RAM 802 has an area for storing computer programs and data loaded from the ROM 803 or an external storage apparatus 806, and for storing data received from an external unit via an I/F (interface) 807. In addition, the RAM 802 has a work area that the CPU 801 uses when executing various processing. In this way, the RAM 802 can appropriately provide various areas. Note, the above-described background storage unit 303 can be applied by using the RAM 802. The ROM 803 stores information that need not be rewritten such as an activation program and setting data of the computer apparatus.

An operation unit 804 is configured by a user interface such as a keyboard, mouse, or touch panel and can input various instructions to the CPU 801 upon operations by a user. For example, the user can set the above-described parameters and the like by operating the operation unit 804.

A display unit 805 is configured by a liquid crystal screen, a touch panel screen, or the like and can display results of processing by the CPU 801 as images, text, or the like. In addition, the display unit 805 may be a projection apparatus that projects images or text.

The external storage apparatus 806 is a large capacity information storage apparatus such as a hard disk drive device. The external storage apparatus 806 stores an OS (operating system) and computer programs and data for causing the CPU 801 to execute or control the processes described above as things that are performed by the image processing apparatuses 300 and 700. The following computer programs, for example, are included in the computer programs saved in the external storage apparatus 806. Specifically, the image input unit 301, the update unit 302, the difference detection unit 304, the moving object determination unit 305, the background collation unit 306, the determination unit 307, the detection setting unit 311, and the count unit 701 are computer programs for causing the CPU 801 to realize functions of each functional unit. Also, in the data saved on the external storage apparatus 806, data that is treated as known information (predetermined values and the like) in the foregoing description, for example, is included. Computer programs or data stored in the external storage apparatus 806 are loaded into the RAM 802 as appropriate in accordance with control by the CPU 801 and become the target of processing by the CPU 801. Note, the above-described background storage unit 303 can be implemented by using the external storage apparatus 806.

The I/F 807 functions as an interface for performing data communication with an external device. For example, a captured image of each frame captured by an image capturing apparatus can be received via the I/F 807 from the image capturing device, and a video can be received via the I/F 807 from a server apparatus that holds the video. Each of the CPU 801, the RAM 802, the ROM 803, the operation unit 804, the display unit 805, the external storage apparatus 806, and the I/F 807 are connected to a bus 808.

Note, the configuration illustrated in FIG. 8 may be applied to the above-described image capturing apparatus 900. Also, the above-described image processing apparatuses 300 and 700 may be embedded in the image capturing apparatus as embedded circuits. In such a case, the image input unit 301 obtains captured images sent from an image capturing unit (having an optical system or image capturing element, converting light from the outside world into an image signal, and configuring a captured image from the image signal) that the image capturing apparatus has. Also, some or all of the embodiments described above may be combined as appropriate, and some or all of the embodiments described above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113845, filed Jun. 14, 2018, which is hereby incorporated by reference herein in its entirety.

What is claimed is:

1. An image processing apparatus comprising:
at least one processor; and
at least one memory coupled to the at least one processor storing instructions that, when executed by the at least one processor, cause the at least one processor to function as:
   a registration unit configured to register, as a background image, a captured image from among captured images sequentially inputted;
   a determination unit configured to determine whether or not a moving object is included in a first background image that the registration unit registered at a first timing; and
   a replacing unit configured to, in a case where the determination unit determines that a moving object is included in the first background image, replace the first background image that the registration unit registered with a second background image which is most similar to a captured image inputted after the determination among second background images registered at a second timing prior to the first timing.

2. The image processing apparatus according to claim 1, wherein the determination unit determines, based on a difference image for a difference between a sequentially inputted captured image and the second background image, whether or not a moving object is included in the first background image.

3. The image processing apparatus according to claim 1, wherein in a case where the determination unit determines that a moving object is included in the first background image, and a similarity between a captured image inputted after the determination and the second background image does not exceed a predetermined value, the replacing unit replaces the first background image with that captured image.

4. The image processing apparatus according to claim 1, wherein the registration unit, in accordance with a frequency of the registrations, controls a number of the second background images to be registered.

5. The image processing apparatus according to claim 1, wherein the instructions, when executed by the at least one processor, cause the at least one processor to further function as:
   a detection unit configured to, based on a difference between a sequentially inputted captured image and the first background image, determine whether or not an object is included in the captured image and detect an existence or absence of a removal in accordance with a result of the determination; and
   a notification unit configured to notify the result of detection by the detection unit.

6. The image processing apparatus according to claim 5, wherein the notification unit counts and notifies the number of the detection of a removal.

7. An image capturing apparatus, comprising:
an image capturing unit configured to obtain a captured image, and
an image processing apparatus, comprising:
   at least one processor; and
   at least one memory coupled to the at least one processor storing instructions that, when executed by the at least one processor, cause the at least one processor to function as:
      a registration unit configured to register, as a background image, a captured image from among captured images sequentially inputted;
      a determination unit configured to determine whether or not a moving object is included in a first background image that the registration unit registered at a first timing; and
      a replacing unit configured to, in a case where the determination unit determines that a moving object is included in the first background image, replace the first background image that the registration unit registered with a second background image which is most similar to a captured image inputted after the determination among second background images registered at a second timing prior to the first timing.

8. An image processing method that an image processing apparatus performs, the method comprising:
registering, as a background image, a captured image from among captured images sequentially inputted;
determining whether or not a moving object is included in a first background image registered at a first timing; and
in a case where it is determined that a moving object is included in the first background image, replacing the first background image with a second background image which is most similar to a captured image inputted after the determination among second background images registered at a second timing prior to the first timing.

9. A non-transitory computer-readable storage medium storing a computer program for causing a computer to function as:
- a registration unit configured to register, as a background image, a captured image from among captured images sequentially inputted;
- a determination unit configured to determine whether or not a moving object is included in a first background image that the registration unit registered at a first timing; and
- a replacing unit configured to, in a case where the determination unit determines that a moving object is included in the first background image, replace the first background image that the registration unit registered with a second background image which is most similar to a captured image inputted after the determination among second background images registered at a second timing prior to the first timing.

* * * * *